US007658098B2

(12) United States Patent
Sun et al.

(10) Patent No.: US 7,658,098 B2
(45) Date of Patent: Feb. 9, 2010

(54) METHOD FOR CONTROLLING VEHICLE EMISSIONS

(76) Inventors: Min Sun, 2584 Locksley Ct., Troy, MI (US) 48083; Brian Kenneth Bolton, 8-2-17 Seijo, Setagaya-ku, Tokyo (JP)

( * ) Notice: Subject to any disclaimer, the term of this patent is extended or adjusted under 35 U.S.C. 154(b) by 36 days.

(21) Appl. No.: 11/967,353

(22) Filed: Dec. 31, 2007

(65) Prior Publication Data

US 2009/0165544 A1 Jul. 2, 2009

(51) Int. Cl.
*G01M 15/00* (2006.01)

(52) U.S. Cl. .................................................. 73/114.32

(58) Field of Classification Search .............. 73/114.32, 73/114.31, 114.33, 114.34, 114.37
See application file for complete search history.

(56) References Cited

U.S. PATENT DOCUMENTS 5,205,260 A * 4/1993 Takahashi et al. ........... 123/494
5,339,681 A * 8/1994 Sekozawa et al. ........ 73/114.32
5,539,638 A 7/1996 Keeler et al.
6,321,156 B1 * 11/2001 Kraemer ..................... 701/102
6,378,515 B1 4/2002 Geyer
6,480,782 B2 11/2002 Brackney et al.
6,497,229 B1 12/2002 Maeda
6,508,242 B2 1/2003 Jaliwala et al.
6,564,785 B2 * 5/2003 Iwasaki ................. 123/568.21
6,588,210 B2 7/2003 Kreso
6,588,261 B1 * 7/2003 Wild et al. ............... 73/114.31
6,671,613 B2 * 12/2003 Stotsky et al. ............... 701/113
6,741,924 B2 * 5/2004 Iwasaki et al. .............. 701/114
2003/0217021 A1 11/2003 Jacobson
2004/0112125 A1 6/2004 Rosa et al.
2004/0260482 A1 * 12/2004 Tanaka et al. ................. 702/45

* cited by examiner

*Primary Examiner*—Eric S McCall
(74) *Attorney, Agent, or Firm*—Bill C. Panagos; Rader, Fishman & Grauer, PLLC

(57) ABSTRACT

A method and system is provided for determining non-sensed vehicle operating parameters of a vehicle system. The method and system further provide for determining an engine air mass flow rate using the non-sensed vehicle operating parameters. A plurality of vehicle operating set-points may be determined using the non-sensed vehicle system operating parameters and the non-sensed engine air mass flow rate. A controller may use the vehicle operating set-points in order to control emissions of the vehicle system.

19 Claims, 2 Drawing Sheets

METHOD FOR CONTROLLING VEHICLE EMISSIONS

BACKGROUND OF THE INVENTION

1. Field of the Invention

The present invention relates generally to systems and methods for determining non-sensed vehicle operating parameters.

2. Background Art

A vehicle system may include a controller configured to facilitate controlling and/or programming any number of vehicle sub-systems. These operations may require the controller to define operating set-points or other operating guidelines for the vehicle system based on current and/or desired operating conditions. Typically, hardware sensors may be included to report the current operating conditions to the controller. However, the hardware sensors generally incorporated within the vehicle system are expensive and may be prone to failure.

DETAILED DESCRIPTION OF THE PREFERRED EMBODIMENT(S)

Figure 1:
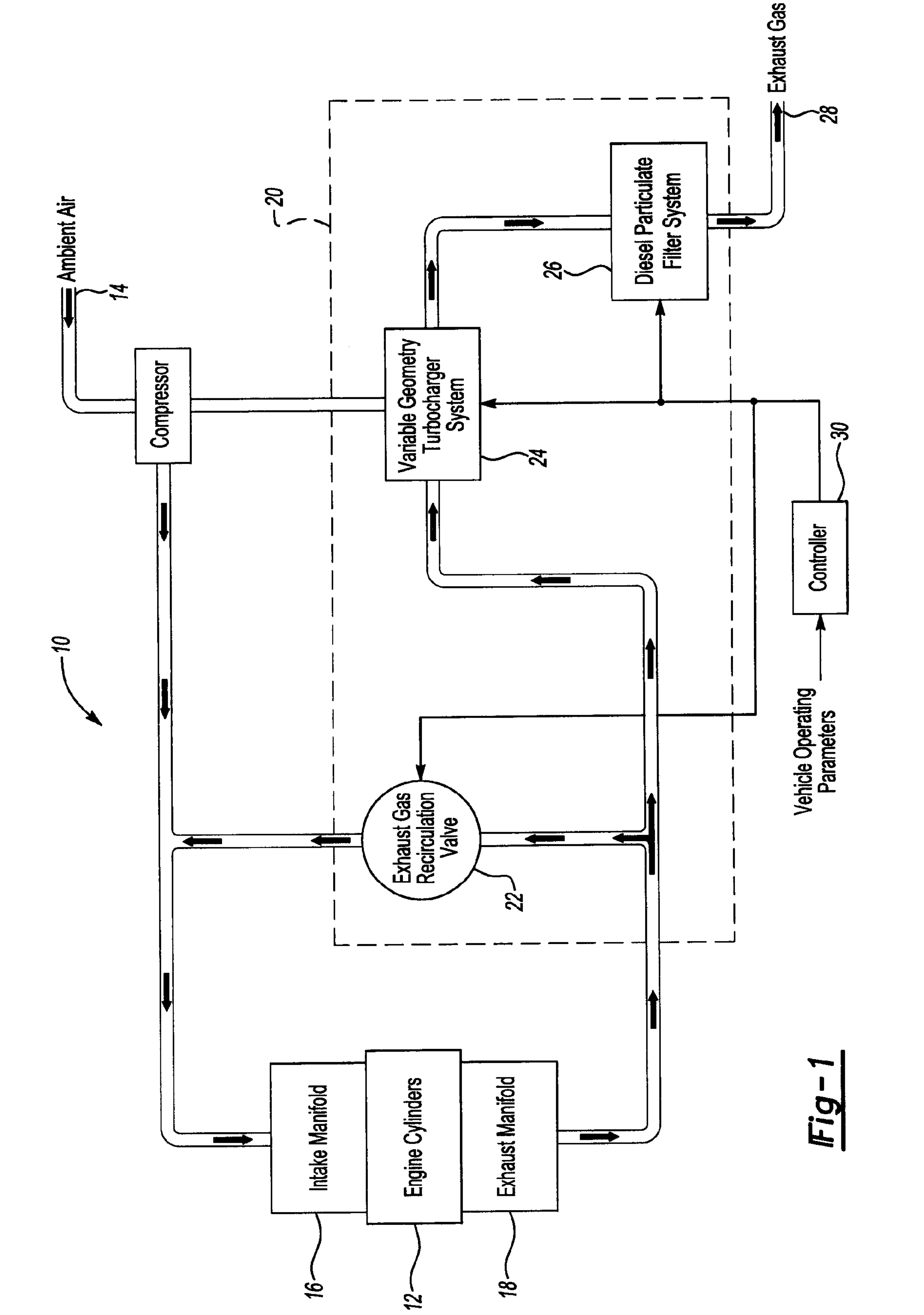
FIG. 1 illustrates a vehicle system in accordance with one non-limiting aspect of the present invention.

FIG. 1 illustrates a vehicle system 10 configured to facilitate driving a vehicle (not shown) in accordance with one non-limiting aspect of the present invention. The system 10 may be configured to drive any number of vehicles, including but not limited to highway trucks, construction equipment, marine vehicles, stationary generators, automobiles, trucks, light and heavy-duty work vehicles, and the like. Of course, the present invention is not intended to be limited to these vehicles and fully contemplates being applicable with any type of vehicle.

The vehicle system 10 may include an engine [12,16,18] having any number of engine cylinders 12 to create a combustion. An intake 14 may supply ambient air to an intake manifold 16. The intake manifold 16 may be coupled to the engine cylinders 12 and may operate to distribute the ambient air and fuel mixture to the engine cylinders 12. An exhaust manifold 18 may also be coupled to the engine cylinders 12. The exhaust manifold may operate to deliver exhaust gas to an emission control system 20.

The emission control system 20 may include an Exhaust Gas Recirculation (EGR) valve 22, a Variable Geometry Turbocharger (VGT) system 24, and a Diesel Particulate Filter (DPF) system 26. Inclusion of the emission control system 20 may assist in controlling polluting emissions typically found in the exhaust gas prior to being released from an exhaust 28. For example, one polluting emission commonly found in the exhaust gas of the vehicle system 10 is Nitrogen Oxide ($NO_x$). By including the emission control system 20, the amount of $NO_x$ released from the exhaust 28 into the atmosphere may be controlled.

The vehicle system 10 may include a controller 30 to control any one or more of the systems [22, 24, 26] described above. The controller 30 may be a DDEC controller available from Detroit Diesel Corporation, Detroit, Mich. Various features of this type of controller may be found in numerous U.S. patents assigned to Detroit Diesel Corporation. The controller 30 may include any number of programming and processing techniques or strategies not described in full detail herein. The present invention contemplates that the vehicle system 10 may include more than one controller, such that, the EGR valve 22, the VGT system 24, the DPF system 26, and other emission control systems may be controlled by means other than the DDEC controller described above.

The controller 30 may be configured to monitor and control the vehicle system 10 based at least partially on non-sensed operating parameters such that emissions may be controlled without relying completely on hardware sensed operating parameters. In more detail, the present invention contemplates an arrangement where the controller may rely on information provided from actual hardware sensors that physically sense vehicle operating parameters, hereinafter referred to as 'sensed parameters', in order to calculate any number of non-sensed operating parameters, hereinafter referred to as 'non-sensed parameters'. The sensed and non-sensed parameters may be used by the controller to specify vehicle operating set-points for the various vehicle systems.

The controller 30 may use the sensed and non-sensed operating parameters to determine the influence of the various vehicle operating set-points on future operations of the vehicle system 10. This forward-looking capability allows the controller 30 to virtually test whether a particular set of vehicle operating set-points affect the emissions of the vehicle system 10. By using the virtually tested vehicle operating set-points, the controller 30 may achieve optimal performance from the emission control system 20 and further control the emissions of the vehicle system 10.

One advantageous result of determining the non-sensed operating parameters is that numerous hardware sensors currently required in the vehicle system 10 may be eliminated. This may include eliminating reliance on hardware sensors to sense air intake mass flow rate, exhaust gas recirculation (EGR) mass flow rate, a turbine mass flow rate, an engine air mass flow rate, a turbine inlet temperature sensor, and a turbine inlet pressure.

The non-sensed intake mass flow rate may be determined according to the following equation:

$$M_{intake} = V_{disp}\frac{RPM_{engine} * IMP}{120 * R_{gas} * IMT}\eta_{vol}$$

where, $M_{intake}$ is the non-sensed intake mass flow rate;

$V_{disp}$ is a displacement volume;

$RPM_{engine}$ is the sensed vehicle engine speed;

IMP is the sensed intake manifold pressure;

$R_{gas}$ is a gas constant;

IMT is the sensed intake manifold temperature; and $\eta_{vol}$ is a volumetric efficiency ratio.

The volumetric efficiency ratio may be determined according to the following equation:

$$\eta_{vol}=\alpha(RPM_{engine},PR_{engine})\eta_{vol\_map}(RPM_{engine},\rho_{intake})$$

where, $\alpha$ is a function determined by the vehicle engine speed and an engine pressure ratio; and $\eta_{vol\_map}$ is a function determined by the vehicle engine speed and an engine intake density.

The non-sensed EGR mass flow rate may be determined according to the following equation:

$$\frac{M_{EGR}^2 * TTI}{TPI * DiscC^2} = C_1 * \Delta P + C_2$$

where, $M_{EGR}$ is the non-sensed EGR mass flow rate;

TTI is the non-sensed turbine inlet temperature;

TPI is the non-sensed turbine inlet pressure;

DisC is an EGR valve discharge coefficient;

$C_1$ is a constant value dependent upon the vehicle system 10 provided;

$C_2$ is a function of the sensed vehicle engine speed and a vehicle engine load; and $\alpha$P is an engine pressure differential between the intake manifold 16 and the exhaust manifold 18 that may increase the non-sensed EGR mass flow rate.

The present invention contemplates that the EGR valve discharge coefficient may be determined using a controlled EGR valve pulse width modulation value.

The non-sensed turbine mass flow rate may be determined according to the following equation:

$$M_{turbine} = \frac{M_{\text{turbine\_reduced}} * TPI}{\sqrt{TTI}}$$

where, $M_{turbine}$ is the non-sensed turbine mass flow rate;

$M_{turbine\_reduced}$ is a reduced turbine mass flow rate;

TTI is the non-sensed turbine inlet temperature; and

TPI is the non-sensed turbine inlet pressure.

The reduced turbine mass flow rate, $M_{turbine\_reduced}$, may be determined using the following equation:

$$M_{turbine\_reduced} = f_{turbine\_map}(S, PR_{turbine})$$

where, $M_{turbine\_reduced}$ is the reduced turbine mass flow rate;

$f_{turbine\_nap}$ is a mapped turbine function;

S is the VGT vane pulse width modulation value; and $PR_{turbine}$ is a VGT pressure ratio.

The reduced turbine mass flow rate may be determined by mapping the VGT pressure ratio at differing VGT vane pulse width modulation values. The present invention contemplates that the look-up table of the reduced turbine mass flow rate may vary depending upon the vehicle system 10 provided such that multiple look-up tables may be required.

The non-sensed turbine inlet temperature may be determined using the following equation:

$$TTI = IMT + \frac{LHV * F_{\text{exh\_energy}} * M_{fueling}}{Cp_{exh} * M_{intake}}$$

where,

TTI is the non-sensed inlet turbine temperature;

IMT is the sensed intake manifold temperature;

LHV is a lower heat value of the fuel;

$F_{exh\_energy}$ is an engine exhaust energy fraction;

$M_{fueling}$ a mass fueling rate;

$Cp_{exh}$ is a specific heat of the exhaust gas; and $M_{intake}$ is the non-sensed intake mass flow rate.

Figure 2:
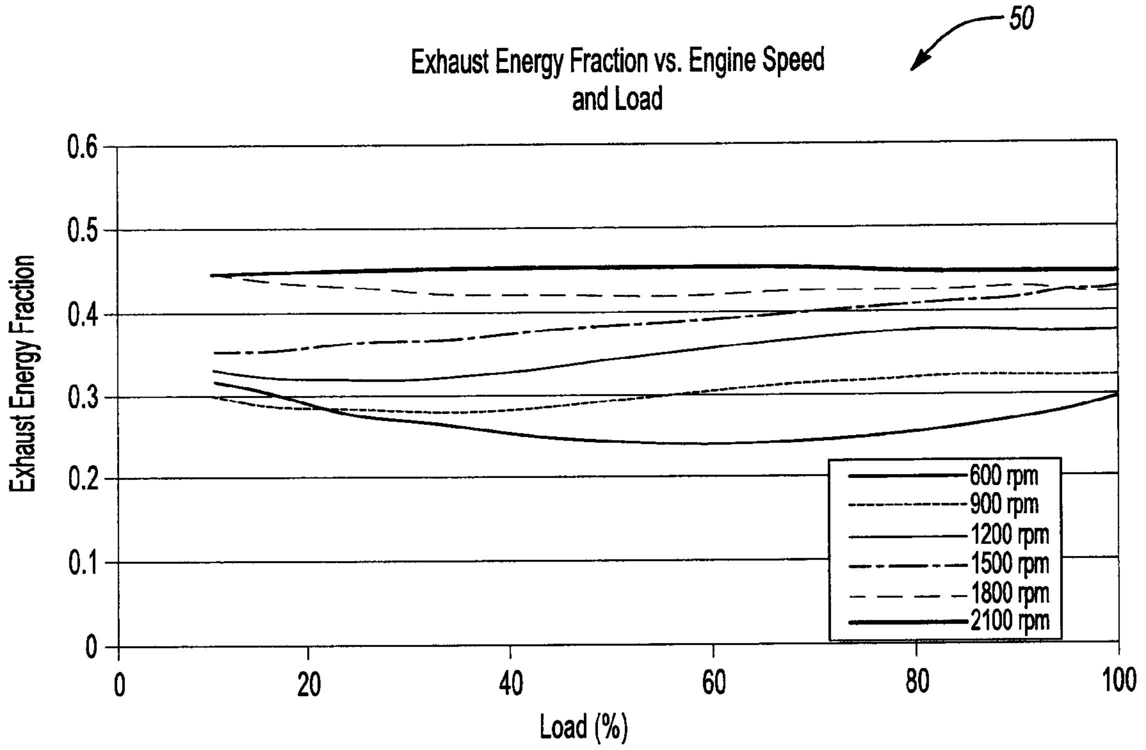
FIG. 2 illustrates the steady state look-up table in accordance with one non-limiting aspect of the present invention.

The non-sensed inlet turbine temperature, TTI, may be determined using a steady state and transient look-up table as illustrated in FIG. 2. The steady state look-up table 50 may map a steady-state exhaust energy fraction against the vehicle engine load at various vehicle engine speeds. Using the steady state look-up table 50 may determine the steady state exhaust energy fraction using the sensed vehicle engine speed and vehicle engine load.

Figure 3:
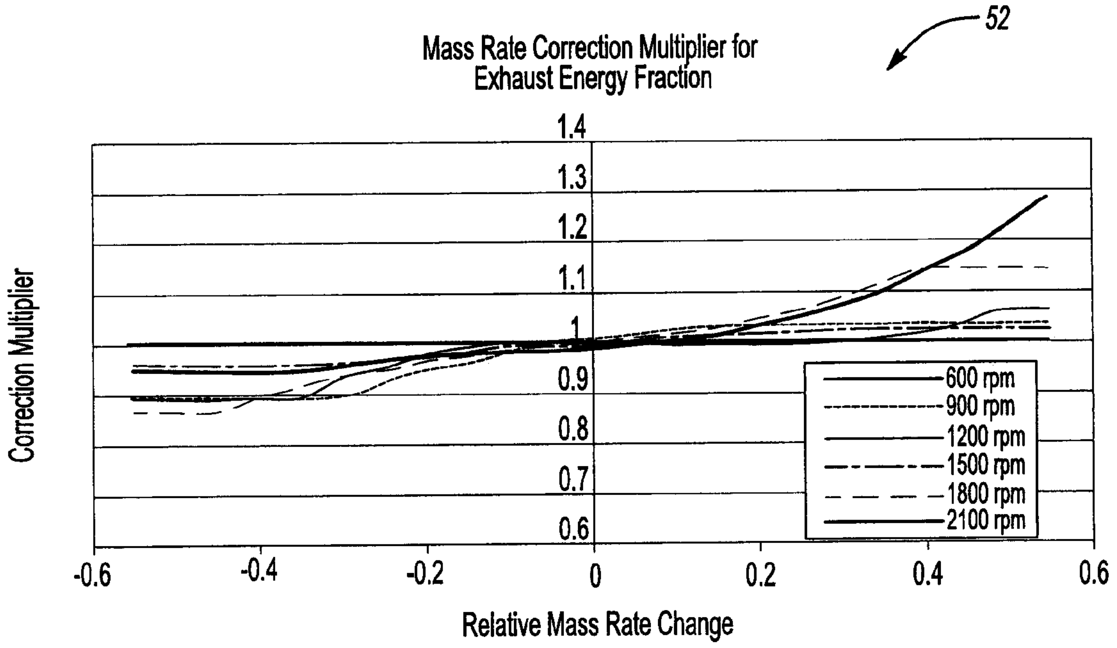
FIG. 3 illustrates the transient look-up table in accordance with one non-limiting aspect of the present invention.

With reference to FIG. 3, a transient look-up table 52 may map a relative mass rate change at varying vehicle engine speeds so that a correction multiplier may be determined. The correction multiplier may be used in conjunction with the determined steady state exhaust energy fraction in order to determine the engine exhaust energy fraction.

The present invention further contemplates that the steady state look-up table 50 and transient look-up table 52 may vary depending upon the vehicle system 10 provided. Thus, numerous steady state and transient look-up tables that correlate to the vehicle system 10 provided.

The non-sensed turbine inlet pressure may be determined using the following equation:

$$\cdot \frac{V_{\text{exh\_manifold}}}{R_{\text{exh\_gas}}} \frac{d}{dt}\left(\frac{TPI}{TTI}\right) = M_{fueling} + M_{intake} - M_{EGR} - M_{turbine}$$

where, $V_{exh\_manifold}$ is a exhaust manifold volume;

$R_{exh\_gas}$ is an exhaust gas constant;

TPI is the non-sensed turbine inlet pressure;

TTI is the non-sensed turbine inlet temperature;

$M_{Fueling}$ is the mass fueling rate;

$M_{intake}$ is the non-sensed intake mass flow rate;

$M_{EGR}$ is the non-sensed EGR mass flow rate; and $M_{turbine}$ is the non-sensed turbine mass flow rate.

Using the non-sensed intake mass flow rate and the non-sensed EGR mass flow rate the controller 30 may determine an engine air mass flow rate. For example, the difference of non-sensed intake mass flow rate and EGR mass flow rate is equal to the engine air mass flow rate.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for controlling emissions of a vehicle system, the method comprising:

determining a plurality of non-sensed vehicle operating parameters; the said plurality of non-sensed vehicle operating parameters includes a non-sensed air intake mass flow rate, the non-sensed air intake mass flow rate being determined using a volumetric efficiency ratio, a vehicle engine speed, a sensed intake manifold pressure, a displacement volume, and a sensed intake manifold temperature;

determining an engine air mass flow rate of the vehicle system using the non-sensed vehicle operating parameters; and determining vehicle operating set-points for use in controlling emissions of the vehicle system, the vehicle operating set-points being determined using the non-sensed vehicle operating parameters and the determined engine air mass flow rate.

2. The method according to claim 1, further comprising determining at least a portion of the non-sensed vehicle operating parameters from a number of sensed vehicle operating parameters.

3. The method according to claim 1, wherein the non-sensed air intake mass flow rate is determined using the following relationship:

$$M_{intake} = V_{disp}\frac{RPM_{engine} * IMP}{120 * R_{gas} * IMT}\eta_{vol}$$

wherein: $M_{intake}$ is the non-sensed intake mass flow rate, $V_{disp}$ is a displacement volume of the vehicle system, $RPM_{engine}$ is the sensed vehicle engine speed, IMP is the sensed intake manifold pressure, $R_{gas}$ is a gas constant, IMT is the sensed intake manifold temperature, and $N_{vol}$ is the volumetric efficiency ratio.

4. The method according to claim 3, wherein the volumetric efficiency is determined using the following relationship:

$$\eta_{vol}=\alpha(RPM_{engine},PR_{engine})\eta_{vol\_map}(RPM_{engine},\rho_{intake})$$

wherein: $\alpha$ is a function determined using the vehicle engine speed and an engine pressure ratio; and $N_{vol\_map}$ is a function determined using the vehicle engine speed and an engine intake density.

5. The method according to claim 1, wherein the plurality of non-sensed vehicle operating parameters includes a non-sensed EGR mass flow rate, the non-sensed EGR mass flow rate being determined using a non-sensed turbine inlet temperature, a non-sensed turbine inlet pressure, an EGR valve discharge coefficient, and an engine pressure differential.

6. The method according to claim 5, wherein the non-sensed EGR mass flow rate is determined using the following relationship:

$$\frac{M_{EGR}^2 * TTI}{TPI * DiscC^2} = C_1 * \Delta P + C_2$$

wherein: $M_{EGR}$ is the non-sensed EGR mass flow rate, TTI is the non-sensed turbine inlet temperature, TPI is the non-sensed turbine inlet pressure, DiscC is an EGR valve discharge coefficient, $C_1$ is a constant value dependent upon the vehicle system, $C_2$ is a function of a sensed vehicle engine speed and a vehicle engine load, and $\Delta P$ is the engine pressure differential.

7. The method according to claim 1, wherein the plurality of non-sensed vehicle operating parameters includes a non-sensed turbine mass flow rate, the non-sensed turbine mass flow rate being determined using a reduced turbine mass flow rate, a non-sensed turbine inlet temperature, and a non-sensed turbine inlet pressure.

8. The method according to claim 7, wherein the non-sensed turbine mass flow rate is determined using the following relationship:

$$M_{turbine} = \frac{M_{turbine\_reduced} * TPI}{\sqrt{TTI}}$$

wherein: $M_{turbine}$ is the non-sensed turbine mass flow rate, $M_{turbine\_reduced}$ is the reduced turbine mass flow rate, TTI is the non-sensed turbine inlet temperature, and TPI is the non-sensed turbine inlet pressure.

9. The method according to claim 8, wherein the reduced turbine mass flow rate is determined using the following relationship:

$$M_{turbine\_reduced}=f_{turbine\_map}(S,PR_{turbine})$$

wherein: $M_{turbine\_reduced}$ is the reduced turbine mass flow rate, $f_{turbine\_map}$ is a mapped turbine function, S is a VGT vane pulse width modulation value, and $PR_{turbine}$ is a VGT pressure ratio.

10. The method according to claim 1, wherein the plurality of non-sensed vehicle operating parameters includes a non-sensed turbine inlet temperature, the non-sensed turbine inlet temperature being determined using a sensed intake manifold temperature, an engine exhaust energy fraction, a mass fueling rate, and the non-sensed intake mass flow rate.

11. The method according to claim 10, wherein the non-sensed turbine inlet temperature is determined using the following relationship:

$$TTI = IMT + \frac{LHV * F_{exh\_energy} * M_{fueling}}{Cp_{exh} * M_{intake}}$$

wherein: TTI is the non-sensed inlet turbine temperature, IMT is the sensed intake manifold temperature, LHV is a lower heat value of the fuel, $F_{exh\_energy}$ is the engine exhaust energy fraction, $M_{fueling}$ is the mass fueling rate, $Cp_{exh}$ is a specific heat of the exhaust gas, and $M_{intake}$ is the non-sensed intake mass flow rate.

12. The method according to claim 1, wherein a non-sensed turbine inlet pressure is determined using a non-sensed turbine inlet temperature, a mass fueling rate, a non-sensed intake mass flow rate, a non-sensed EGR mass flow rate, and the non-sensed turbine mass flow rate.

13. The method according to claim 12, wherein the non-sensed turbine inlet pressure is determined using the following relationship:

$$\cdot\frac{V_{exh\_manifold}}{R_{exh\_gas}}\frac{d}{dt}\left(\frac{TPI}{TTI}\right) = M_{fueling} + M_{intake} - M_{EGR} - M_{turbine}$$

wherein: $V_{exh\_manifold}$ is a exhaust manifold volume, $R_{exh\_gas}$ is an exhaust gas constant, TPI is the non-sensed turbine inlet pressure, TTI is the non-sensed turbine inlet temperature, $M_{Fueling}$ is the mass fueling rate, $M_{intake}$ is the non-sensed intake mass flow rate, $M_{EGR}$ is the non-sensed EGR mass flow rate, and $M_{turbine}$ is the non-sensed turbine mass flow rate.

14. A method for controlling emissions of a vehicle system, the method comprising:

determining a non-sensed EGR mass flow rate, a non-sensed air intake mass flow rate, a non-sensed turbine mass flow rate, a non-sensed turbine inlet temperature, and a non-sensed turbine inlet pressure using a plurality of sensed vehicle operating parameters;

determining an engine air mass flow rate of the engine using the non-sensed EGR mass flow rate, the non-sensed air intake mass flow rate, the non-sensed turbine mass flow rate, the non-sensed turbine inlet temperature, and the non-sensed turbine inlet pressure;

determining a plurality of vehicle operating set-points using the non-sensed EGR mass flow rate, the non-sensed air intake mass flow rate, the non-sensed turbine mass flow rate, the non-sensed turbine inlet temperature, the non-sensed turbine inlet pressure, and the engine air mass flow rate; and determining future operations of the vehicle system using the determined vehicle operating set-points, wherein the determined future operations are used to modify the determined vehicle operating set-points in order to control the emissions of the vehicle system.

15. The method according to claim 14, wherein the sensed vehicle operating parameters include an intake manifold pressure, an intake manifold temperature, and a vehicle engine speed.

16. A system for use in controlling emissions of a vehicle system, the system comprising:

a plurality of hardware sensors providing a plurality of sensed vehicle operating parameters, the plurality of hardware sensors including an intake manifold pressure sensor, an intake manifold temperature sensor, and a vehicle engine speed sensor; and a controller configured for:

determining a plurality of non-sensed vehicle operating parameters based upon the data provided from the plurality of sensed vehicle operating parameters;

determining a non-sensed engine air mass flow rate based upon the determined non-sensed vehicle operating parameters;

determining a plurality of vehicle operating set-points using the non-sensed vehicle operating parameters and the non-sensed engine air mass flow rate; and controlling emissions of the vehicle system using the determined vehicle operating set-points.

17. The method according to claim 16, wherein the non-sensed vehicle operating parameters include a non-sensed air intake mass flow rate, the non-sensed air intake mass flow rate being determined using the following relationship:

$$M_{intake} = V_{disp}\frac{RPM_{engine} * IMP}{120 * R_{gas} * IMT}\eta_{vol}$$

wherein: $M_{intake}$ is the non-sensed intake mass flow rate, $V_{disp}$ is a displacement volume, $RPM_{engine}$ is a sensed vehicle engine speed, IMP is a sensed intake manifold pressure, $R_{gas}$ is a gas constant, IMT is a sensed intake manifold temperature, and $N_{vol}$ is a volumetric efficiency ratio.

18. The method according to claim 16, wherein the non-sensed vehicle operating parameters include a non-sensed EGR mass flow rate, the non-sensed EGR mass flow rate being determined using the following relationship:

$$\frac{M_{EGR}^2 * TTI}{TPI * DiscC^2} = C_1 * \Delta P + C_2$$

wherein: $M_{EGR}$ is the non-sensed EGR mass flow rate, TTI is a non-sensed turbine inlet temperature, TPI is a non-sensed turbine inlet pressure, DisC is an EGR valve discharge coefficient, $C_1$ is a constant value dependent upon the vehicle system, $C_2$ is a function of a sensed vehicle engine speed and a vehicle engine load, and $\Delta P$ is a engine pressure differential.

19. The method according to claim 16, wherein the non-sensed vehicle operating parameters include a non-sensed turbine mass flow rate, the non-sensed turbine mass flow rate being determined using the following relationship:

$$M_{turbine} = \frac{M_{\text{turbine\_reduced}} * TPI}{\sqrt{TTI}}$$

wherein: $M_{turbine}$ is the non-sensed turbine mass flow rate, $M_{turbine\_reduced}$ is a reduced turbine mass flow rate, TTI is a non-sensed turbine inlet temperature, and TPI is a non-sensed turbine inlet pressure.

* * * * *